March 19, 1929.  E. R. SEWARD  1,705,545
LATHE CARRIAGE FEED MECHANISM
Filed Sept. 12, 1927  2 Sheets-Sheet 1
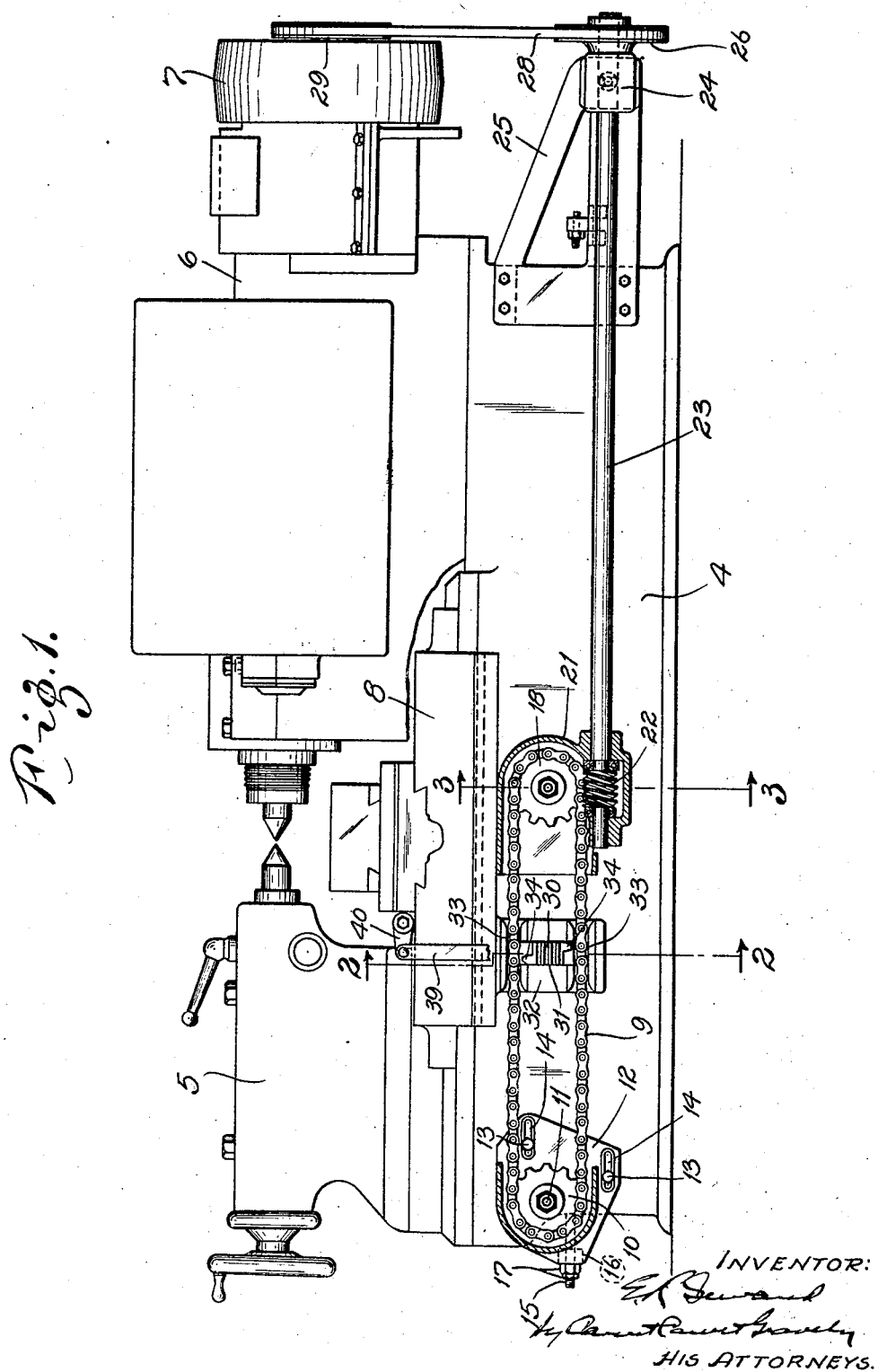
INVENTOR:
HIS ATTORNEYS.

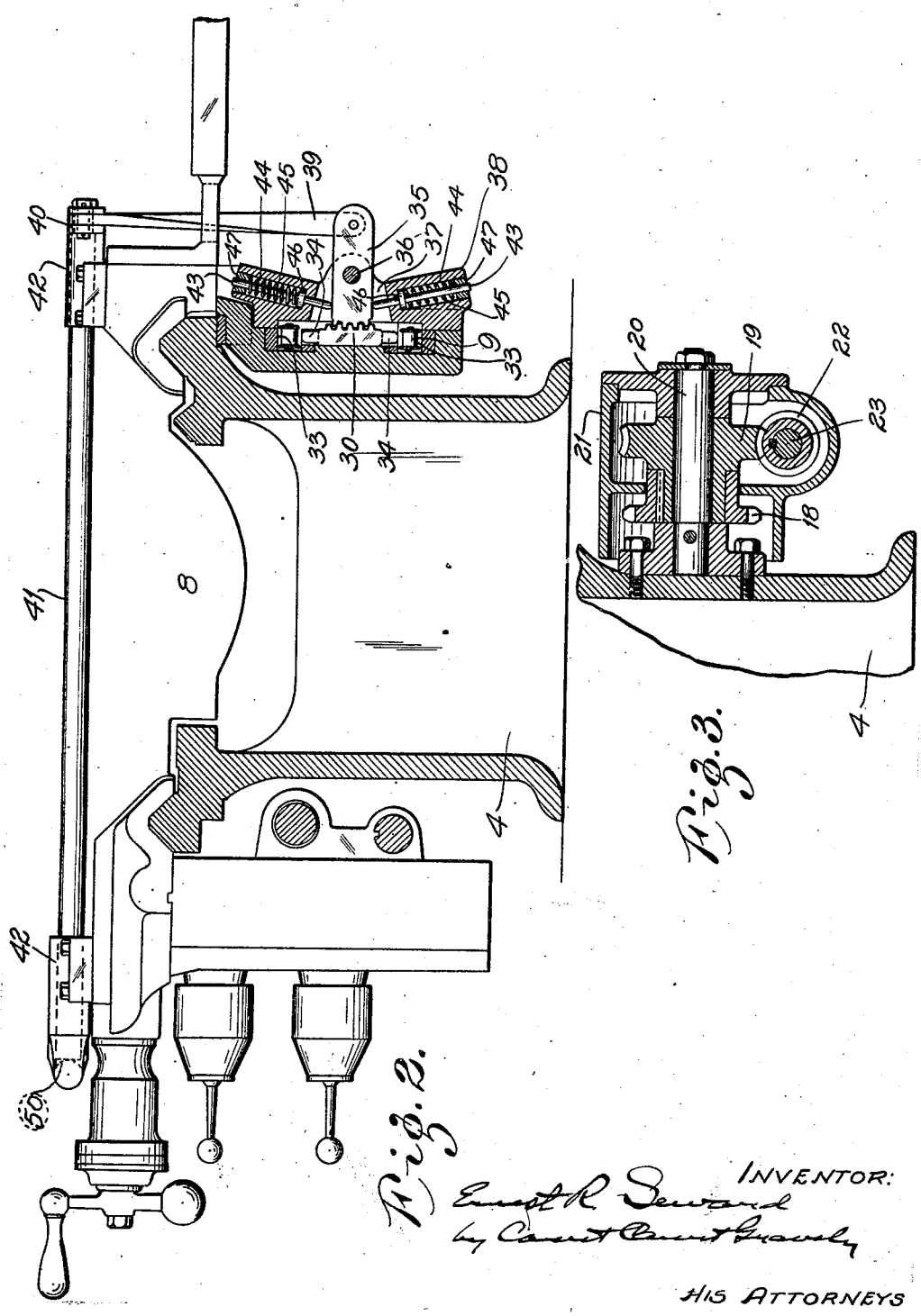

Patented Mar. 19, 1929.

1,705,545

UNITED STATES PATENT OFFICE.

ERNEST R. SEWARD, OF ST. LOUIS, MISSOURI, ASSIGNOR TO LEHMANN MACHINE COMPANY, OF ST. LOUIS, MISSOURI, A CORPORATION OF MISSOURI.

LATHE-CARRIAGE-FEED MECHANISM.

Application filed September 12, 1927. Serial No. 218,876.

My invention relates to lathes and has for its principal object to provide improved mechanism for effecting a rapid feed of the lathe carriage thereof independently of ordinary carriage feed. Other objects are to enable the carriage to be quickly and easily engaged with and disengaged from the rapid feed mechanism, and to provide for simplicity and cheapness of construction and compactness of design.

The invention consists principally in a continuously operating endless chain mounted on the lathe bed and traveling in the direction in which the lathe carriage moves and in mechanism for connecting the carriage with either stretch of said chain to cause said carriage to move therewith in either direction of its sliding movement. The invention also consists in the parts and in the combinations and arrangements of parts hereinafter described and claimed.

In the accompanying drawing, which forms part of this specification and wherein like symbols refer to like parts wherever they occur, Fig. 1 is a rear elevation of a lathe equipped with a rapid traverse mechanism embodying my invention;

Fig. 2 is an enlarged vertical cross-section on the line 2—2 in Fig. 1; and

Fig. 3 is a vertical section through the housing for the driving sprocket and worm gearing on the line 3—3 in Fig. 1.

Referring to the accompanying drawing, my invention is shown in connection with a lathe comprising a bed 4, a tail stock 5, a head stock 6 provided with a main driving pulley 7, and a carriage 8 mounted on ways on top of the bed for sliding movement between said head stock and said tail stock. This construction of lathe is well known and it is considered unnecessary to illustrate it in detail.

Located at the rear side of the lathe bed is a continuously operating endless sprocket chain 9 arranged with its oppositely moving stretches one above the other. The sprocket chain is supported at one end by means of an idler sprocket wheel 10 fixed to a horizontal shaft 11 journaled in a housing 12, which is adjustably secured to the rear face of the lathe bed by means of cap screws 13, which extend through horizontal slots 14 in said housing and are threaded into said lathe bed. The housing 12 is adjusted to take up slack in its sprocket chain by means of an adjusting screw 15, which is threaded through a lug 16, on said housing, in position to abut against the adjacent end of the lathe bed. The adjusting screw 15 is located in the desired adjusted position by means of lock nuts 17.

The opposite end of the endless sprocket chain 9 is supported on a driving sprocket wheel 18 fixed to the hub of the worm gear 19 journaled on a horizontal shaft 20 fixed in a housing 21 attached to the rear side of the lathe bed. The worm gear 19 is driven by means of a worm 22 located in the housing 21 beneath said worm gear and is fixed to one end of a horizontally disposed worm shaft 23, which end is rotatably supported in said housing. The other end of the horizontally disposed worm drive shaft 23 extends beyond the head stock end of the lathe and is rotatably supported in a bearing 24 provided therefor in a bracket 25, which is bolted to the rear side of the lathe bed. This end of the worm drive shaft 23 is extended far enough beyond the bearing 24 to accommodate a pulley 26 which is fixed thereto. This pulley is driven from the continuously driven main drive pulley 7 of the lathe by means of a belt 28 which passes over the worm shaft pulley 26 and a pulley 29 which is fixed to said main drive pulley.

The lathe carriage is connected to the upper and lower stretches of the continuously operating sprocket chain 9, to cause it to move rapidly along the lathe bed in either direction, by means of a rack bar 30 arranged for vertically sliding movement between the upper and lower stretches of the continuously operating sprocket chain. This rack bar is mounted in a vertical slideway 31 provided therefor in the outer face of a bracket 32 which depends from the rear side of the carriage, between the sprocket chain and the rear side of the lathe bed and may be bolted to or made integral with the carriage. The outer face of the depending carriage bracket 32 is also provided above and below the rack bar 30 with horizontal slideways 33 for slidably supporting the reversely moving upper and lower stretches of the sprocket chain. The vertically slidable rack bar 30 is provided at its upper and lower ends with teeth 34 adapted to enter the links in the upper and lower stretches of the sprocket chain when the rack bar is shifted in the direction of either of said stretches. Thus, when the upper tooth of the rack bar is engaged with the upper stretch of the sprocket chain, the carriage will move in the direction in which said stretch travels; and likewise, when the lower tooth of the rack bar is engaged with the lower stretch of the sprocket chain, the carriage will move in the direction in which this stretch of the chain is travelling.

The rack bar is shifted vertically in the depending carriage bracket to engage one or the other of the two stretches of the sprocket chain by means of a horizontally pivoted lever 35 mounted for vertically swinging movement on a horizontal pivot pin 36 in a vertical slot 37 provided therefor in a cover plate 38 bolted or otherwise detachably secured to the rear face of the depending carriage bracket 32. The inner arm of the horizontally pivoted lever 35 is provided with teeth which intermesh with the teeth on the outer face of the rack bar 30; and the outer arm of said lever has a link connection 39 with a rock arm 40 fixed to the rear end of a horizontal rock rod or shaft 41 which extends across the top of the carriage and is journaled in the bearings 42 secured thereto. The front end of the rock rod 41 terminates adjacent to the front side of the lathe and is provided with an operating handle 50.

The vertically sliding rack bar 30 is normally held out of engagement with the upper and lower stretches of the continuously operating sprocket chain by means of pins 43 slidably mounted in recesses 44 provided therefor in the cover plate 38 above and below the inner arm of the lever 35. The pins 43 are disposed with their inner ends in abutting relation to the top and bottom edges of the inner arm of the lever 35. The pins 43 are pressed against the top and bottom edges of the inner arm of the lever 35 by means of coiled springs 45 mounted on said pins between stop shoulders 46 at the inner ends thereof and plugs 47, which are threaded into the outer ends of the recesses 44 and are perforated to slidably support the outer ends of said pins. The pressure of the springs may be regulated by adjusting the threaded plugs.

By the arrangement described, the lathe carriage 8 can be rapidly moved along the lathe bed in either direction of its sliding movement, by manipulating the operating handle 50 at the forward end of the rock rod 41, which operation, by reason of the link connection 39 between the rock arm 40 at the rear end of said rock rod and the horizontally pivoted lever 35 carried by the depending carriage bracket 32, causes said lever to swing on its pivot. This swinging movement of the lever 35, by reason of its toothed engagement with the vertically slidable rack bar 30, causes said bar to be shifted vertically into engagement with one or the other of the oppositely moving stretches of the continuously operating sprocket chain, depending on the direction in which the inner arm of said lever is swung. Thus, the carriage may be shifted in either direction of its sliding movement at the same speed on which the sprocket chain is moving, merely by rocking the rock rod in a direction which will cause the rack bar to be shifted into engagement with the stretch of the chain which travels in the direction in which it is desired to move the carriage. When it is desired to stop the carriage the operating handle is released, thereby permitting the spring pressed pins to return the rapid traverse mechanism to its normal or inoperative position.

The hereinbefore described arrangement admits of considerable modification without departing from the invention; therefore, I do not wish to be limited to the precise arrangement shown and described.

What I claim is:

1. In a lathe, the combination with a bed, and a carriage movable along said bed, of a continuously operating endless sprocket chain secured to said bed and traveling in the direction of sliding movement of said carriage, means for connecting said carriage with either of the oppositely moving stretches of said end of the sprocket chain, said means comprising a single member mounted in said carriage entirely between said stretches for sliding movement into and out of engagement with either of the oppositely moving stretches of said endless chain, and means for normally holding said sliding member out of engagement with both stretches of said chain.

2. In a lathe, the combination with a bed, and a carriage movable along said bed, of a continuously operating endless sprocket chain mounted on said bed and traveling in the direction of the sliding movement of said carriage, means for connecting said carriage with either of the oppositely moving stretches of said end of the sprocket chain, said means comprising a single member mounted on said carriage entirely between said stretches for sliding movement into and out of engagement with either of the oppositely moving stretches of said endless chain, means mounted on the carriage for actuating said slidable member, and yieldable means for normally maintaining said sliding member out of engagement with both stretches of said chain.

3. In a lathe, the combination with a bed, and a carriage movable along said bed, of a continuously operating endless sprocket chain secured to said bed and traveling in the direction of sliding movement of said carriage, means for connecting said carriage with either of the oppositely moving stretches of said end of the sprocket chain, said means comprising a single member mounted in said carriage between said stretches for sliding movement into and out of engagement with either stretch of said chain, a lever mounted on said carriage and having one arm operatively engaging said slidable member for actuating the same, a rock rod mounted on said carriage, and a link connection between said rod and the other arm of said lever.

4. In a lathe, the combination with a bed, and a carriage movable along said bed, of a continuously operating endless sprocket chain secured to said bed and traveling in the direction of sliding movement of said carriage, means for connecting said carriage with either of the oppositely moving stretches of said chain, said means comprising a single member mounted in said carriage between said stretches for sliding movement into and out of engagement with either stretch of said chain, a lever mounted on said carriage and having one arm operatively connected with said slidable member for actuating the same, a rock rod mounted on said carriage, a link connection between said rod and the other arm of said lever, and means engaging said lever for normally holding said slidable chain engaging member out of engagement with both stretches of said chain.

5. In a lathe, the combination with a bed, and a carriage movable along said bed, of a continuously operating endless sprocket chain mounted on said bed and traveling in the direction of sliding movement of said carriage, means for connecting said carriage with either of the oppositely moving stretches of said end of the sprocket chain, said means comprising a single member mounted in said carriage between said stretches for sliding movement into and out of engagement with either stretch of said chain, a lever mounted on said carriage and operatively engaging said chain engaging member, a rock rod mounted on said carriage, a link connection between said rod and said lever, and means for normally holding said chain engaging member and the actuating members therefor in inoperative position, said means comprising spring pressed pins mounted in said carriage and bearing against the opposite sides of said lever to resist swinging movement thereof.

6. In a lathe, the combination with a bed, and a carriage movable along said bed, of a continuously operating endless sprocket chain mounted on said bed and traveling in the direction of sliding movement of said carriage, means for connecting said carriage with either of the oppositely moving stretches of said end of the sprocket chain, said means comprising rack bar mounted on said carriage between said stretches for sliding movement into and out of engagement with either stretch of said chain, a lever mounted on said carriage and having teeth intermeshing with the teeth of said rack bar, and a rock rod mounted on said carriage and having a link connection with said lever.

7. In a lathe, the combination with a bed, and a carriage movable along said bed, of a continuously operating endless sprocket chain mounted on said bed and traveling in the direction of sliding movement of said carriage, means for connecting said carriage with either of the oppositely moving stretches of said end of the sprocket chain, said means comprising a rack bar mounted on said carriage between said stretches for sliding movement into and out of engagement with either stretch of said chain, a lever mounted on said carriage and having teeth meshing with the teeth on said rack bar, a rock rod extending transversely of the carriage, a link connection between said rod and said lever, and means for normally holding said rack bar and the actuating members therefor in operative position, said means comprising spring pressed pins mounted on said carriage and bearing against the opposite sides of said lever.

Signed at St. Louis, Missouri, this 8th day of September, 1927.

ERNEST R. SEWARD.